Sept. 16, 1958

N. HAGOPIAN 2,852,137

RAISIN CLEANER

Filed June 5, 1956

INVENTOR.
Nathan Hagopian
BY Webster & Webster
ATTYS.

Sept. 16, 1958    N. HAGOPIAN    2,852,137
RAISIN CLEANER
Filed June 5, 1956    2 Sheets-Sheet 2

INVENTOR.
Nathan Hagopian
BY Webster & Webster
ATTYS.

United States Patent Office 2,852,137
Patented Sept. 16, 1958

2,852,137

RAISIN CLEANER

Nathan Hagopian, Fresno, Calif., assignor to Commercial Manufacturing & Supply Co., Fresno, Calif., a partnership Application June 5, 1956, Serial No. 589,543

2 Claims. (Cl. 209—139)

The present invention is directed to, and it is a major object to provide, a novel pneumatic apparatus for cleaning dry produce; i. e. to remove stems, leaves, and other undesirable objects which are lighter in weight than such produce. While the apparatus is especially designed to clean raisins by removing free stems initially intermingled therewith, the invention is equally well adapted for use to similarly clean other produce, such as beans, peas, corn, etc.

Another important object of this invention is to provide a raisin cleaner wherein the cleaning operation—i. e. the separation of the raisins from the stems—is accomplished by passing the same over a shaker screen through which a relatively forceful air stream passes from below; the stems being entrained in—and carried away by—such air stream while the raisins, being heavier, traverse the screen and deliver therefrom in clean condition.

An additional object of the invention is to provide a raisin cleaner, as above, wherein the shaker screen is disposed—at an incline relative to horizontal—in an upright flue in which the air stream flows; there being novel associated mechanism operative to feed the raisins and initially intermingled stems to the screen at one end, and the cleaned raisins from the screen at the other end, at a controlled rate whereby to assure against overloading the screen (which would impair the pneumatic separation of the stems), and to maintain an even output from the apparatus.

A further object of the invention is to provide a raisin cleaner, as in the preceding paragraph, wherein such mechanism—while functioning as described—is arranged to prevent the admission of any substantial quantity of air into the flue adjacent or above the shaker screen; this to the end that the velocity of the air stream passing through such screen and flowing upwardly therefrom is not materially reduced, or its stem separating effectiveness lessened.

It is also an object of the invention to provide a practical, reliable, and durable raisin cleaner, and one which will be exceedingly effective for the purpose for which it is designed.

These objects are accomplished by means of such structure and relative arrangement of parts as will fully appear by a perusal of the following specification and claims.

Figure 1:
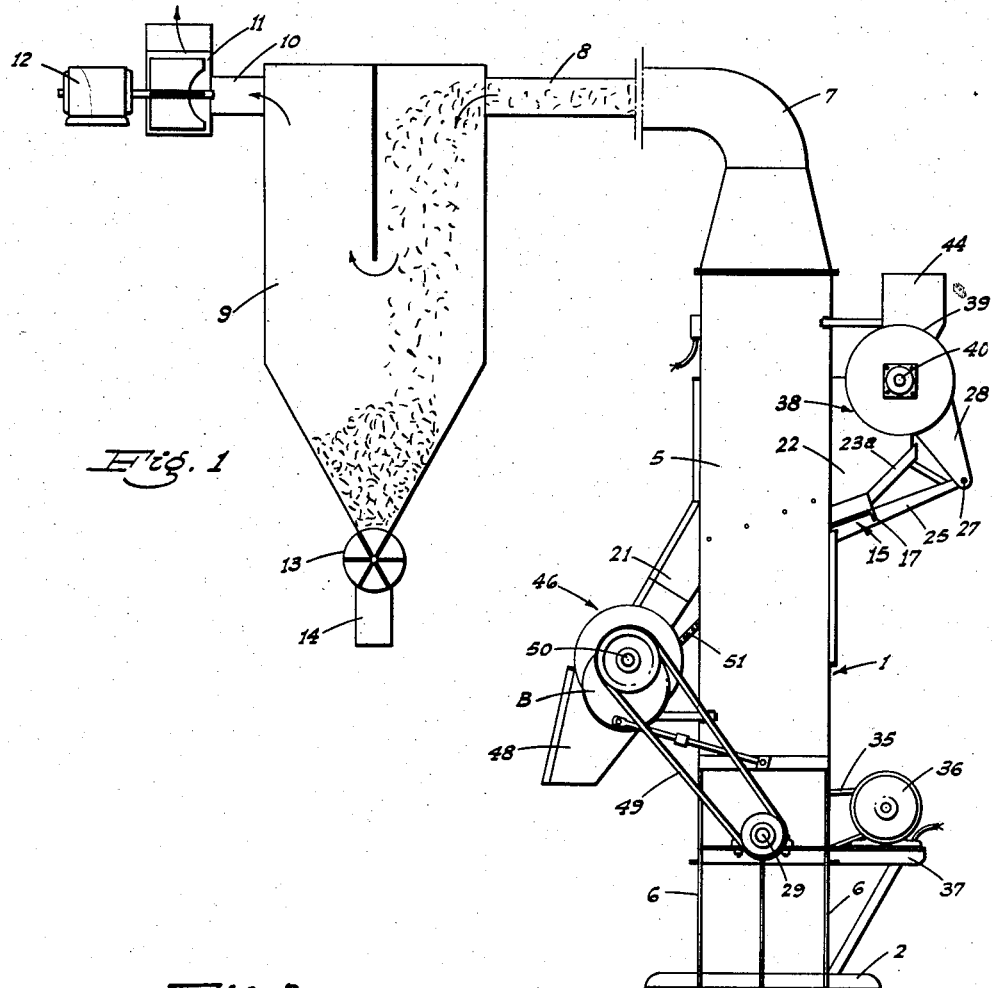
Fig. 1 is a side elevation of the raisin cleaner; the portion of the apparatus which communicates with the flue at its upper end being shown more or less in diagrammatic outline.
Figure 3:
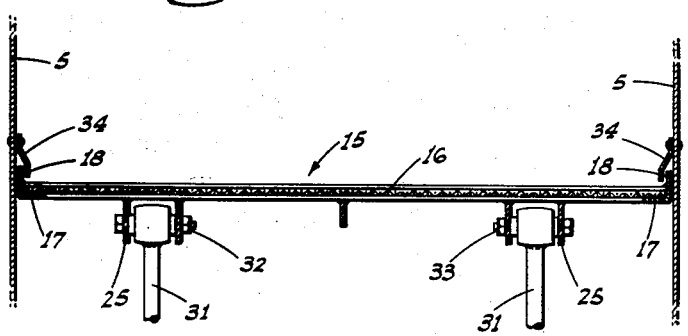
Fig. 3 is an enlarged fragmentary transverse section on line 3—3 of Fig. 2.

Referring now more particularly to the drawings, and to the characters of reference marked thereon, the apparatus comprises a perpendicular flue, indicated generally at 1, which is of substantial height, rectangular in horizontal section, and supported at its lower end by a base 2.

The flue 1 includes a front wall 3, a rear wall 4, and sides 5. The front wall 3 and rear wall 4 terminate short of the lower ends of the sides 5, whereby to provide air entry openings 6 at the lower end of said flue.

At its upper end the flue 1 is connected by an elbow transition 7 to a conduit 8 which delivers to the intake of a cyclone 9, while the air outlet of such cyclone is coupled by a conduit 10 to a suction fan 11 driven by an electric motor 12.

Upon operation of the suction fan 11 it will be recognized that a relatively forceful air stream will be caused to flow through the air entry opening 6, upwardly in the flue 1, through the cyclone 9, and thence discharged from the outlet of the suction fan 11.

The cyclone 9—which may be of generally conventional construction—is provided, at its lower end, with a driven rotary gate 13 having a discharge spout 14; such gate being operative to unload material from the bottom of the cyclone 9 without permitting air entry in a contra direction.

The major structural assembly of the raisin cleaner includes, with the flue 1, a rectangular shaker screen unit, indicated generally at 15, and which unit comprises a screen 16 supported in a border frame 17 having upstanding sides 18.

The shaker screen unit 15 is disposed in the flue 1 intermediate its ends, and at a forward and downward incline relative to the rear wall 4. The front wall 3 and said rear wall 4 are formed with openings, indicated at 19 and 20 respectively; the shaker screen unit 15 being of a length such that it projects at the ends through the related openings.

The opening 19 in the front wall 3 communicates with an enclosed transfer hopper 21 fixed to front wall 3 and extending therefrom at a relatively sharp forward and downward incline. The opening 20 in the rear wall 4 communicates with an enclosed transfer chute 22 fixed to the rear wall 4 and extending at an upward and outward incline relative thereto. The bottom plate 23 of the transfer chute 22 is separate from the latter and is fixed to the rear end of the shaker screen unit 15 for motion therewith; the forward lower edges of the sides of said transfer chute 22 lapping inside the rear portions of the sides 18 of said shaker screen unit 15, as shown at 24 in Fig. 2. Also, the bottom plate 23 of the transfer chute 22 has upstanding flanges 23a at the sides and top, as shown, lapping adjacent portions of said chute 22.

The shaker screen unit 15 is supported for up and down vibratory motion in the following manner:

Transversely spaced, longitudinal arms 25 are fixed to the under side of the shaker screen unit 15 and thence extend rearwardly through slots 26 in rear wall 4 to a rear end termination a substantial distance back of said wall. At their rear ends the arms 25 are pivoted, as at 27, to fixed brackets 28.

A cross shaft 29 is journaled in and intersects the flue 1 adjacent but above the air entry openings 6, and such cross shaft carries transversely spaced eccentric cams 30 journaled in connection with the lower ends of corresponding connecting rods 31 which lead upwardly and pivotally connect at the top, as at 32 and 33, to corresponding ones of the arms 25 within said flue 1.

The cross shaft 29 when driven thus imparts an up and down vibratory motion to the shaker screen unit 15; the upstanding sides 18 of the latter working within the confines of lip flanges 34 fixed to the inner faces of the sides 5 and depending in overhanging relation to said sides 18.

The cross shaft 29 is driven, at one end and exteriorly of the flue 1, by an endless belt and pulley unit 35 from an electric motor 36 supported on a platform 37.

The upper portion of the enclosed transfer chute 22 communicates with a transverse-axis rotary gate, indicated generally at 38, mounted in rigid relation to said chute and the flue by suitable means. The rotary gate 38 includes a cylinder 39, a central cross shaft 40 extending from end to end of said cylinder, and a plurality of circumferentially spaced radial vanes or paddles 41 having rubber tips 42 which run in engagement with the inner face of the cylinder 39; said paddles, together with the tips, being full length of said cylinder. With this arrangement the rotary gate 38 provides, between the vanes or paddles 41, a plurality of material feeding compartments 43. At the top the rotary gate 38 is in communication with a feed hopper 44 and into which initially intermingled raisins and free stems are delivered by a suitable conveyor 45, here shown as of trough type.

Before being fed by the conveyor 45 to the hopper 44 the raisins are passed through what is known as a stemming machine in order to free the stems for the purpose of subsequent separation.

The brackets 28 to which the arms 25 are pivoted are, in the present embodiment, rigidly secured to—and depend from—the cylinder 39 of the rotary gate 38.

At the lower end thereof the transfer hopper 21 leads to, and communicates with, another rotary gate 46 disposed therebelow and suitably supported from said hoppe and the flue. The rotary gate 46 is of the same construction as the rotary gate 38, including a central cross shaft 47. Adjacent the bottom thereof the rotary gate 46 delivers to a discharge chute 48.

The rotary gates 38 and 46 are simultaneously driven—at like speed and in a direction such that the gate 38 feeds to the transfer chute 22, and the rotary gate 46 feeds to the discharge chute 48—by means of the following:

At the projecting end opposite the endless belt and pulley unit 35, the cross shaft 29 is connected by an endless belt and pulley unit 49 to the drive shaft 50 of a reduction gear box B, which in turn drives the cross shaft 47 of the rotary gate 46. At the opposite end of said cross shaft 47 the same is connected by an endless chain and sprocket unit 51 to the corresponding end of the cross shaft 40 of the rotary gate 38. Thus, with the described arrangement the motor 36 is not only operative to actuate the shaker screen 15 through the medium of the connecting rods 31, but also drives the rotary gates 38 and 46 simultaneously.

*Operation*

In operation, the above described raisin cleaner functions in the following manner:

With the motors 12 and 36 working, a relatively forceful stream of air enters through the openings 6 and flows upwardly in the flue 1 through the shaker screen 15, which is vibrating up and down.

Figure 2:
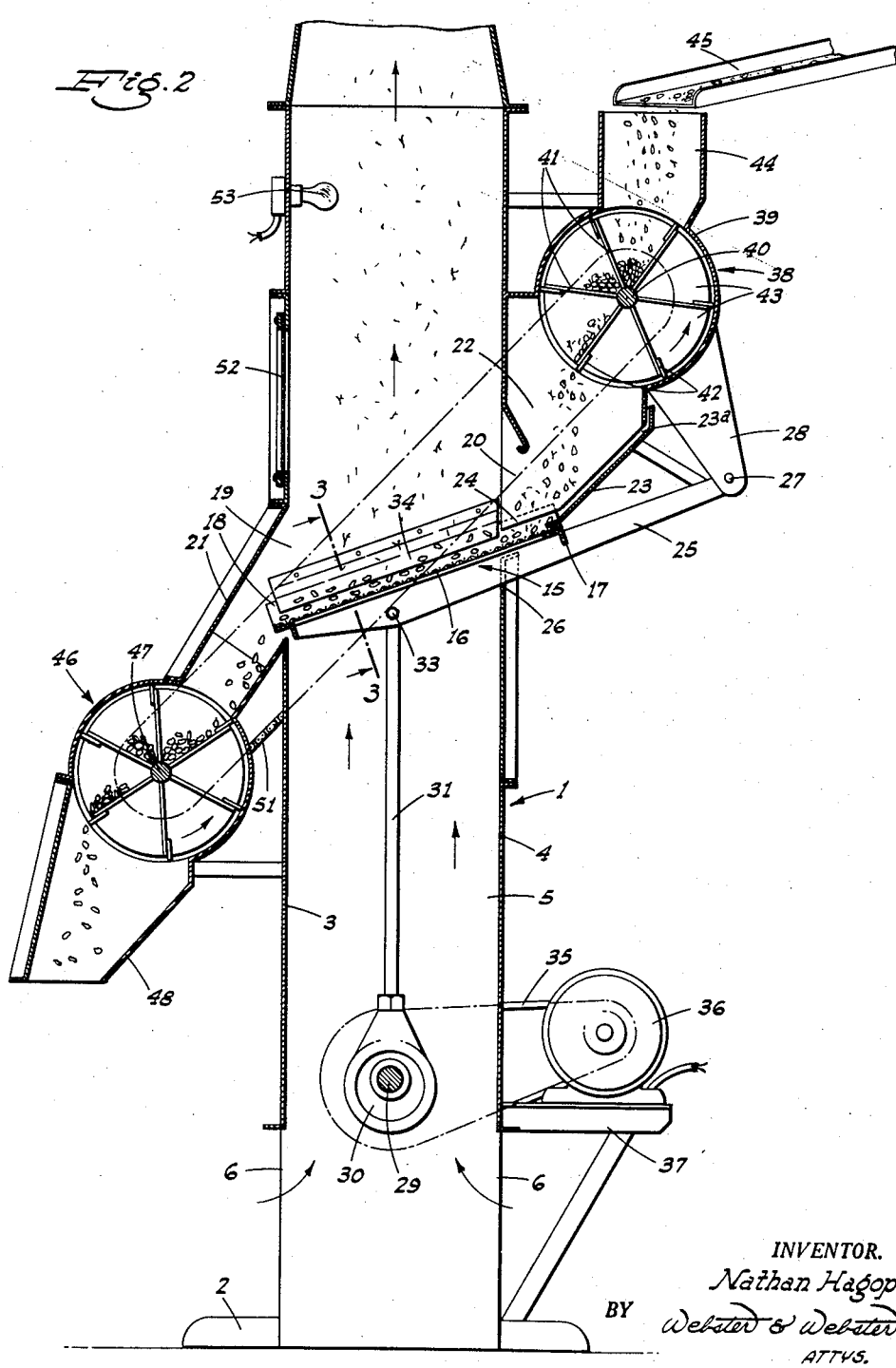
Fig. 2 is an enlarged sectional elevation of the raisin cleaner.

As shown in Fig. 2, the initially intermingled raisins and free stems deliver from the conveyor 45 into the hopper 44 and are thence fed in controlled quantity by the rotary gate 38 into the transfer chute 22. From such transfer chute 22 the intermingled raisins and free stems fall onto the upper end of the inclined shaker screen unit, thence gravitating thereon, under the influence of the vibratory motion, toward the lower end of said unit.

As the bottom 23 of the transfer chute 22 is fixed to the rear end of the shaker screen unit 15, said plate is likewise vibrated up and down; this to assure against any piling up of the material in said chute.

As the raisins and free stems are jounced on the shaker screen unit 15, said stems are entrained in the air stream passing through said unit, thus flowing upwardly in the flue in such stream. However, the raisins—being heavier—continue to traverse the shaker screen unit 15 and ultimately fall from the lower end thereof into the transfer hopper 21, whence they are delivered by the rotary gate 46 into the discharge chute 48. From the discharge chute 48 the cleaned raisins are either received in boxes or on a suitable carry-off conveyor.

The free stems which are picked up and entrained in the air stream and carried upwardly in the flue 1 are separated—as shown in Fig. 1—in the cyclone 9 from the air in a conventional manner; the air then passing through the suction fan 11, while the separated stems are withdrawn from the bottom of said cyclone 9 by the rotary gate 13. Such rotary gate 13 is of the same structure as the gates 38 and 46.

By reason of the structure of the gates 13, 38, and 46, they are operative to feed material as described, yet without permitting the entry of any substantial quantity of air into the apparatus. This is essential for the reason that the velocity of the air stream in the flue 1 must be maintained relatively high in order to obtain proper separation of the stems from the raisins, and if air in substantial quantity could—for example—gain access in the flue 1 through the openings 19 and 20, such velocity would be reduced to a point such that the effectiveness of the apparatus would be impaired. A similar situation exists with respect to the rotary gate 13.

It is therefore evident that the use of material feeding but air baffling gates is an important feature of the present invention; the rotary gates 38 and 46, in addition to the foregoing functions, also serving to control the rate at which the material passes through the apparatus, and which is necessary to minimize the chance of overloading the shaker screen 15 and assuring of a relatively constant output of cleaned raisins from the apparatus.

In order to permit inspection of the cleaning operation, the front wall 3 is formed—adjacent but above the shaker screen unit 15—with a window 52, and which inspection is facilitated by a light 53 mounted in the flue above said window.

With the described apparatus, relatively lighter objects, such as stems, leaves, etc., can be positively and effectively separated—as a continuous operation—from heavier produce, with the lighter objects and said produce being discharged from the apparatus at separate points.

From the foregoing description it will be readily seen that there has been produced such an apparatus as will substantially fulfill the objects of the invention as set forth herein.

While this specification sets forth in detail the present and preferred construction of the apparatus, still in practice such deviations therefrom may be resorted to as do not form a departure from the spirit of the invention, as defined by the appended claims.

Having thus described the invention, the following is claimed as new and useful, and upon which Letters Patent are desired:

1. Apparatus, for pneumatically separating produce from lighter objects initially intermingled therewith, comprising an upright flue, means to cause a forceful air stream flowing upwardly in the flue, an inclined shaker screen in the flue intersecting said air stream, a longitudinal arm fixed to the screen and projecting therefrom, the flue having a slot therein through which the arm extends to a termination exteriorly of said flue, means transversely pivoting the arm at its outer end for up and down swinging motion, a connecting rod transversely pivoted on the screen and depending in the flue, a driven cross shaft in the flue below the screen, the adjacent end of the connecting rod being eccentrically journaled on the cross shaft, the flue including opposed walls having openings therein through which adjacent ends of the screen project, an enclosed chute communicating with the opening related to the upper end of the screen, means to feed the produce and initially intermingled lighter objects into the chute, said produce and lighter objects passing from the chute onto the screen, an enclosed hopper communicating with the opening related to the lower end of the screen, the produce falling from the lower end of the screen into said hopper, and means to receive and discharge the produce from such hopper.

2. Apparatus, for pneumatically separating produce from lighter objects initially intermingled therewith, comprising an upright flue, means to cause a forceful air stream flowing upwardly in the flue, an inclined shaker screen in the flue intersecting said air stream, a longitudinal arm fixed to the screen and projecting therefrom, the flue having a slot therein through which the arm extends to a termination exteriorly of said flue, means transversely pivoting the arm at its outer end for up and down swinging motion, a connecting rod transversely pivoted on the screen and depending in the flue, a driven cross shaft in the flue below the screen, the adjacent end of the connecting rod being eccentrically journaled on the cross shaft, the flue including opposed walls having openings therein through which the adjacent ends of the screen project, an enclosed chute communicating with the opening related to the upper end of the screen and thence extending upwardly and outwardly therefrom, a rotary feed gate on the upper end of the chute adapted to feed the produce and initially intermingled lighter objects into the chute without admission of any substantial amount of air thereinto, said produce and lighter objects passing from the chute onto the screen, said objects being entrained in the air stream and flowing upwardly therewith from said screen, an enclosed hopper communicating with the opening related to the lower end of the screen and thence extending downwardly and outwardly therefrom, the produce falling from the lower end of the screen into the hopper, and a rotary discharge gate on the lower end of the chute adapted to receive and discharge produce from the chute without admission of any substantial amount of air thereinto.

References Cited in the file of this patent

UNITED STATES PATENTS

| | | |
|---|---|---|
| 987,460 | Heldman | Mar. 21, 1911 |
| 1,593,729 | Stebbins | July 27, 1926 |
| 2,099,379 | Spellacy | Nov. 16, 1937 |
| 2,577,295 | Ahlmann | Dec. 4, 1951 |
| 2,679,316 | Ruepp | May 24, 1954 |

FOREIGN PATENTS

| | | |
|---|---|---|
| 380,196 | Great Britain | Sept. 15, 1932 |
| 455,219 | Great Britain | Oct. 12, 1936 |
| 62,289 | Sweden | Jan. 25, 1927 |